Dec. 30, 1958  E. GILLETTE  2,866,397
MEANS FOR MAKING COMPOSITE PICTURES
Filed Aug. 20, 1954
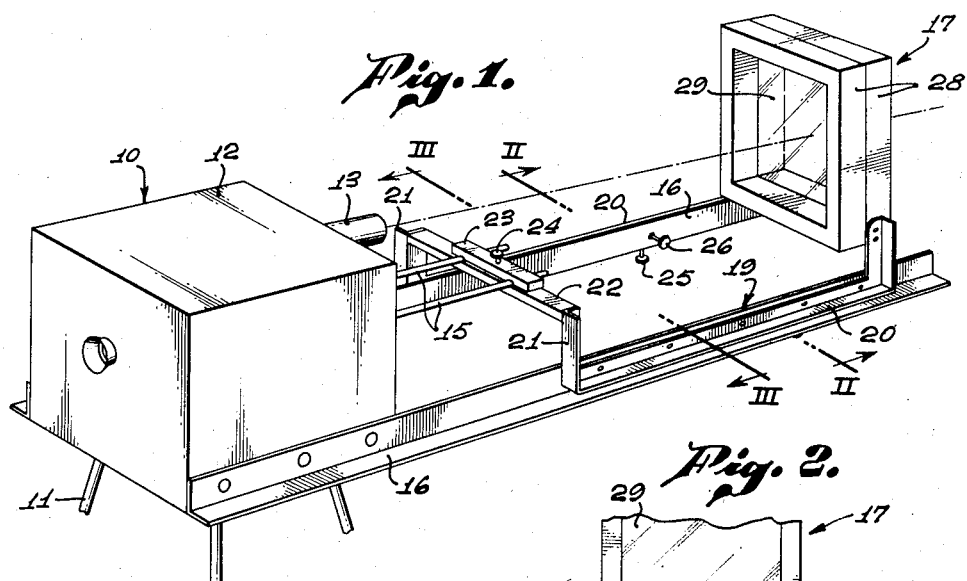
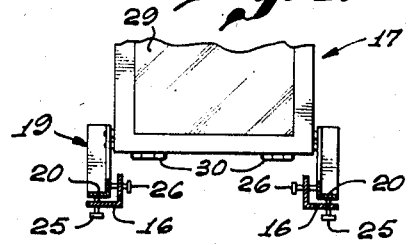
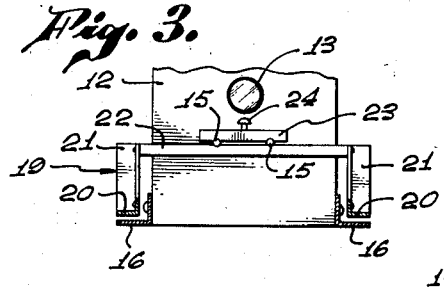
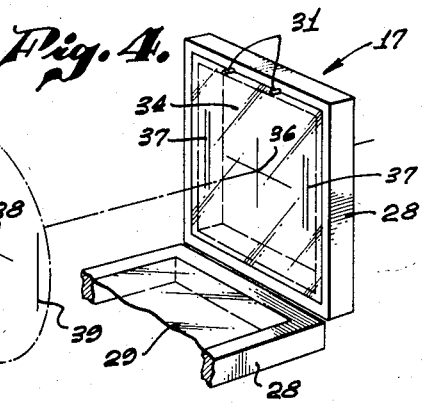
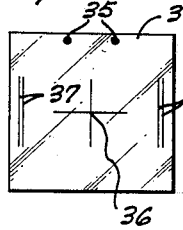
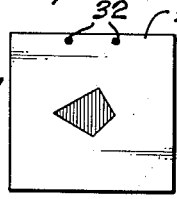
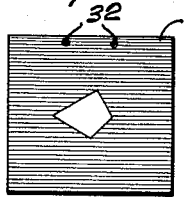
INVENTOR.
EDWIN GILLETTE,
BY
ATTORNEY.

United States Patent Office 2,866,397
Patented Dec. 30, 1958

2,866,397

MEANS FOR MAKING COMPOSITE PICTURES

Edwin Gillette, Los Angeles, Calif.

Application August 20, 1954, Serial No. 451,158

3 Claims. (Cl. 95—36)

This invention relates to means for making composite pictures wherein matte cells may be accurately and precisely aligned with respect to objective lens of a camera whereby subject matter to be photographed at different places and at different times may be readily composed on a single, or on multiple film strips for subsequent printing as a composite picture.

Accurate alignment of mattes in front of a camera lens is essential to the making of composite pictures produced by successive partial exposures of a film strip. Obviously misalignment of a matte which blocks off part of a scene or subject matter within the field of the camera lens and film aperture will result in mismatching of such separately partially exposed portions of a film strip and in obvious lines of demarcation therebetween. Accurate matching of such separately exposed portions of a film strip has been difficult to achieve heretofore and has consumed an undue amount of time to produce desired results.

This invention contemplates means for producing composite pictures on a film strip by utilizing complementary mattes which are precisely positioned for accurate matching of separately exposed portions of the film strip, the precise positioning of said mattes being accomplished by use of an alignment cell. The alignment cell of this invention is provided with reticule means which may be cooperably registered by adjustment of the matte-holding frame with reticule means carried by the viewing or finding lens of the camera.

It is the primary object of this invention therefore to disclose and provide a novel means for making composite pictures employing matte cells.

An object of this invention is to disclose and provide means for making composite photographs wherein matte cells are precisely positioned with respect to a taking lens and aperture of a camera.

Another object of this invention is to disclose and provide a novel apparatus utilizing matte cells wherein matte cells are quickly and accurately positioned.

A further object of this invention is to disclose and provide a novel means for making composite photographs wherein a matte cell may be prepared by outlining portions of the subject matter to be photographed while viewing the subject matter through the lens of a camera.

This invention contemplates particularly the provision of an alignment cell so employed with respect to a matte cell holding frame and a camera so that precise accurate registration of complementary matte cells with respect to a camera is afforded.

Generally speaking, the invention contemplates a means for making a composite picture wherein an alignment cell having reticule means is positioned in front of the lens of a camera in a matte-holding frame so as to accurately position the matte-holding frame with respect to the optical axis, focus and field of view of the lens and the film aperture of a camera. The alignment cell may then be removed and a matte cell positioned on the matte-holding frame and portion of the scene to be photographed may be accurately outlined on the matte cell by viewing the actual scene through the viewing lens of the camera while reaching around the camera and tracing the outline on the matte cell. After the portion to be deleted is blocked out in well-known manner on the matte cell, a film strip in the camera may be exposed to light from that portion of the scene transmitted through the remaining transparent portion of said matte cell. A second subject matter to be photographed which is to be composed with the first scene may be accurately determined by first properly aligning the matte-holding frame with respect to the new subject matter and new position of the camera by placing the alignment cell therein and precisely positioning the matte-holding frame with respect to the camera lens as before. When the matte-holding frame is so positioned, a complementary second matte cell may be positioned in the frame and the unexposed portion of the film strip may be exposed to light transmitted through the complementary transparent portion of the second matte cell from the second subject matter to be photographed. A completely exposed film strip is thus provided having composite separately photographed portions in accurate complementary relation.

Other objects and advantages of this invention will be readily apparent from the following description of the drawings in which an exemplary embodiment of the means of this invention is illustrated.

In the drawings:

Fig. 1 is a perspective view of a camera and a matte-holding frame positioned in front thereof.

Fig. 2 is a fragmentary transverse sectional view taken in the plane indicated by line II—II of Fig. 1.

Fig. 3 is a fragmentary transverse sectional view taken in the plane indicated by line III—III of Fig. 1.

Fig. 4 is a fragmentary diagrammatic perspective view showing reticule means on the finder or viewing lens of the camera, the alignment cell in position, and film aperture.

Fig. 5 is a plan view of an alignment cell used in this invention.

Figs. 6 and 7 are plan views of complementary matte cells as employed in this invention.

A camera means generally indicated at 10 may be of any well-known make and manufacture and may be supported upon a suitable camera support 11 indicated here as a tripod. A camera body 12 includes an objective lens assembly 13 adapted to be removably positioned in front of a film aperture 12a. A viewing or finder lens means 14 may be carried by the camera body adjacent the objective lens assembly 13 and may be readily positioned over the aperture 12a when directing the camera means to the subject matter to be photographed. It is understood that the objective lens assembly 13 and viewing means 14 may be shifted into and from their operative positions in front of the aperture.

The camera body 12 may include a pair of forwardly extending parallel rods 15 disposed below the optical axis "O" of the objective lens assembly in taking position. The rods 15 may be a standard attachment usually provided on professional cameras.

This invention includes, by way of example, the provision of a pair of forwardly extending parallel way members 16 of angle section also carried by the camera body 12. The way members 16 provide parallel ways for adjustably carrying a rectangular matte-holding frame means generally indicated at 17. The frame means 17 may include a rearwardly extending bracket means 19 connected thereto in any suitable manner. The bracket means 19 may include parallel angle-section arms 20 which are each provided with an upwardly offset portion 21 and a transverse end portion 22 of angle section which extends below the rods 15. The end portions 22 may be slidably connected to the rods 15 by a suitable clamp means 23, said clamp means having releasable adjustment bolt 24 for permitting the clamp means 23 and the bracket means 19 to be longitudinally slidably on the rods 15 and way members 16. Normally the angle section members 20 may nest within the angle section frame members 16.

The matte-frame means 17 may be adjustably positioned vertically and horizontally as well as longitudinally as mentioned above. Vertical adjustment of the matte-frame means 17 may be provided by adjusting screw bolts 25 each threadedly carried by a way member 16 and having its end bearing against the lower surface of a bracket member 20. The members 20 may be thus vertically displaced with respect to the way members by tightening or loosening the adjusting screw bolts 25.

Lateral or horizontal adjustment of the frame means may be provided similarly by adjusting screw bolts 26 each threadedly engaged with an upstanding leg of the angle section way member 16 and having its end bearing against the bracket member 20. Thus the matte-frame means 17 may be adjustably positioned so that it may be accurately aligned with the optical axis of the camera means. It is understood that lateral and vertical adjustment is relatively limited because the way members 16 are accurately mounted parallel to the optical axis.

The matte-holding frame means may be of well-known form and comprises a pair of rectangular frame sections 28, each carrying a pane 29 of transparent plate glass. The frame sections 28 may be hinged together along adjacent transverse bottom edges as at 30 so that in closed position the frame sections and the opposed surfaces of the panes 29 may lie in close face-to-face parallel relation. In open positions one of the frame sections 28 may be pivoted downwardly so as to permit access to matte cells held between the panes 29. The normally vertical frame section 28 includes on its top cross member a pair of rearwardly projecting, laterally spaced registration pins 31 for accurately mounting a matte cell thereon. Matte cells 33 and 33a employed in this invention may each include a rectangular sheet of transparent celluloid material each sheet having a pair of holes 32 therein adapted to receive the registration pins 31.

An alignment cell 34 as employed in this invention may comprise a rectangular sheet of transparent Celluloid material, said sheet likewise having spaced registration holes 35 therein for cooperation with the pins 31. The alignment cell 34 includes reticule means which may comprise crossed hairs 36 in the center thereof for alignment of the optical axis of the camera with respect to the cell, and spaced parallel vertical lines or indices 37 at one or both sides thereof to accurately adjust the field size of the matte to that of the camera aperture, since it is well known that magnification and field of view of a given lens vary slightly with the focus.

The viewing lens 14 may be similarly provided with reticule means including crossed hairs 38 defining the optical axis of the camera when lens 14 is in operative position and side lines 39 which are correlated with the width of the aperture 12a of the camera.

Operation of the apparatus of this invention is described and explained with respect to an exemplary single film strip which may be employed with the camera means 10. The camera means 10 provided with the matte-holding frame means 17 may be suitably positioned with respect to a first scene or subject matter to be photographed. In order to accurately position the frame means 17 the alignment cell 34 is placed on pins 31 of the frame means 17. The subject matter to be photographed is then viewed through the viewing lens until the selected subject matter to be photographed lies within the film aperture 12a as defined by the reticule means of the viewing lens. The proper focus is obtained and the matte-holding frame means 17 is adjusted vertically, longitudinally and laterally until the crossed hairs of the alignment cell and of the viewing lens reticule are in alignment and the side lines 39 of the viewing lens reticule lie between the pairs of parallel lines or indices 37 of alignment cell 34. The frame means 17 is then secured in this aligned position and is precisely positioned with respect to the camera means and to the subject matter to be photographed.

The rear frame section 28 of the frame means 17 may then be unfastened and pivoted downwardly so that the alignment cell 34 may be removed from pins 31 and a matte cell 33 substituted therefor. While the frame section 28 is in down position the portion of the subject matter to be photographed may be delineated or outlined on the matte cell 33 by viewing the scene through the viewing lens. Such an outline may be readily sketched by reaching around the camera means and marking the matte cell 33 with a suitable grease pencil or the like. After an outline has been made in such a manner, matte cell 33 may be removed from the frame means 17 and the portion of the matte cell through which is viewed that portion of the scene to be deleted is covered by an opaque paint or other suitable material so that light from the scene to be deleted will not be transmitted therethrough.

The completed first matte cell 33 is then again positioned in the matte-holding frame means 17 on the registration pins 31 and the frame sections 28 clamped together so as to immovably hold cell 33 between the frame sections 28. The film strip in the camera may then be exposed to light from that portion of the scene which is transmitted through the transparent portion of the matte cell 33. Such exposure of the film strip results in only partial exposure thereof.

After such partial exposure of the film strip, the camera means 10 may be repositioned as by moving to another location for the purpose of exposing the remainder of the film strip to different subject matter to be photographed to be combined and composed with the first scene. The complementary second matte cell 33a is prepared in well-known manner from the first matte cell 33 so as to obstruct and prevent transmission of light to the already exposed portion of the film strip while permitting light to be transmitted to the unexposed portion of the film strip.

At the new position of the camera means the matte-holding frame 17 is again accurately positioned with respect to the camera means and with respect to the subject matter to be photographed by placing alignment cell 34 on the registration pins 31 and aligning the matte-holding frame longitudinally, vertically and laterally so that the reticule means on the finding lens and on the alignment cell 34 are once again in proper aligned relationship. Such accurate alignment of the position of the matte-holding frame means with respect to the optical axis and focus of the camera lens and the film aperture 12a assures that light transmitted through the second matte cell 33a will fall only upon the unexposed portion of the film strip.

After the matte-holding frame is so aligned and the alignment cell 34 is removed from the frame-holding means 17, the second complementary matte cell 33a is positioned on the registration pins and the sections 28 clamped together. The film strip meanwhile has been rewound and the unexposed portions thereof are then exposed to light transmitted from the second scene through the transparent portion of the second complementary matte cell 33a. Such second exposure of the film strip in this example completes exposure thereof, and the result is a composite picture free from a visible line of demarcation between the two components of the composite picture.

The steps of aligning the matte-holding frame with respect to the camera means before exposing the film provides accurate correlation of the matte cells with respect to the film strip, and such accurate correlation is accomplished quickly, easily and in a minimum of time. The use of an alignment cell in such a manner together with the advantage of outlining portions of the subject to be photographed as actually seen or viewed through the camera assures that only such portions of the scene which are desired will be included in accurate register in the resulting composite picture.

While the exemplary illustration describes the use of this apparatus with only one film strip it will be readily understood that two or more film strips may be employed and combined in printing as is well known in the art of making composite pictures. Further, while the exemplary composite picture is illustrated as having only two complementary components, it is understood that two or more complementary components may be included in such a composite picture. In the latter case it is understood that the alignment cell would be employed for precise positioning of the matte-holding frame before exposing each component portion of the film strip.

It is understood that various modifications and changes may be made in the means for making composite picture as described above and which come within the spirit of this invention, and all such modifications and changes coming within the scope of the appended claims are embraced thereby.

I claim:

1. In an apparatus for making a composite picture utilizing matte cells and a single film negative having component film portions exposable at different locations and precisely matched on said single film, the combination of: a camera means including viewing means provided with optical alignment reticule elements and laterally spaced magnification alignment reticule elements; a matte cell frame means supported from said camera means and spaced at a distance from said viewing means whereby delineation of a portion of a scene being viewed may be outlined by a cameraman simultaneously viewing the scene through the viewing means, said matte cell frame means including registration pins; a transparent alignment cell positioned on said registration pins and including optical alignment reticule elements and magnification alignment reticule elements; and adjustment means for said matte cell frame means whereby said reticule elements on said alignment cell may be visually aligned with corresponding reticule elements on the viewing means to precisely position said matte cell frame means with respect to said camera means whereby a matte cell positioned on said cell frame means may precisely mask its respective component film portion.

2. In an apparatus for making a composite motion picture utilizing matte cells and a single film strip having component film strip portions exposable at different locations and precisely matched on said single film strip, the combination of: a camera means; viewing means on said camera having optical alignment reticule means and magnification alignment reticule means; a matte cell frame means supported from the camera means and spaced from said viewing means a relatively short distance whereby a cameraman may reach around said viewing means and delineate on a matte cell carried by the matte cell frame means a portion of a scene being viewed to be masked, said matte cell frame means including registration pins; a transparent alignment cell positioned on said registration pins and including optical alignment reticle elements and magnification alignment reticule elements; and means for adjusting the position of said matte cell frame means to align the reticle elements on said alignment cell with the reticule means in said viewing means for precisely locating the matte cell frame means with respect to said camera means whereby said camera means and a matte cell carried by said matte cell frame means may be positioned relative to each other so that component film strip portions on said single film strip may be precisely matched.

3. In combination with an apparatus for making a composite picture utilizing matte cells and a single film negative having component film portions exposable at different locations and precisely matched on said single film negative, the apparatus including a camera means provided with a viewing means, and matte cell frame means provided with positioning elements supported from the camera means in spaced relation to the viewing means: optical alignment reticule means and magnification alignment means spaced therefrom provided on the viewing means; a transparent alignment cell positioned on said positioning elements on said matte cell frame means and provided with optical alignment reticule elements and magnification alignment reticule elements spaced therefrom and correspondingly related to the reticule means on the viewing means; and means for longitudinally and laterally adjusting the position of said matte cell frame means to align reticule elements on said alignment cell with the reticule means on said viewing means for precisely locating the matte cell frame means with respect to said camera means whereby a matte cell positioned on said cell frame means may precisely mask its respective component film portion.

References Cited in the file of this patent

UNITED STATES PATENTS

| Re. 17,125 | Seitz | Nov. 6, 1928 |
|---|---|---|
| 1,273,435 | Williams | July 23, 1918 |
| 1,616,723 | Wandersleb | Feb. 8, 1927 |
| 1,737,021 | Pollock | Nov. 26, 1929 |
| 1,760,156 | Mann | May 27, 1930 |
| 1,776,269 | Pomeroy | Sept. 30, 1930 |
| 1,787,662 | Boedicker | Jan. 6, 1931 |
| 1,888,054 | Tipecska et al. | Nov. 15, 1932 |
| 2,459,418 | Ellis | Jan. 18, 1949 |
| 2,539,324 | Pollock | Jan. 23, 1951 |
| 2,615,364 | Tondreau | Oct. 28, 1952 |

FOREIGN PATENTS

| 449,992 | Great Britain | July 8, 1936 |
|---|---|---|